(12) United States Patent
Sakaguchi et al.

(10) Patent No.: US 9,951,235 B2
(45) Date of Patent: Apr. 24, 2018

(54) INK COMPOSITION, INK JET RECORDING DEVICE, INK JET RECORDING METHOD, AND METHOD FOR REUSING RECORDING MEDIUM

(71) Applicant: MIMAKI ENGINEERING CO., LTD., Nagano (JP)

(72) Inventors: Ayumi Sakaguchi, Nagano (JP); Masaru Ohnishi, Nagano (JP); Hironori Hashizume, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 14/862,158

(22) Filed: Sep. 23, 2015

(65) Prior Publication Data

US 2016/0090496 A1    Mar. 31, 2016

(30) Foreign Application Priority Data

Sep. 25, 2014  (JP) ................................. 2014-195854
Sep. 25, 2014  (JP) ................................. 2014-195856
Jul. 31, 2015   (JP) ................................. 2015-152937

(51) Int. Cl.
*C09D 10/00*     (2006.01)
*C09D 11/101*   (2014.01)
(Continued)

(52) U.S. Cl.
CPC ......... *C09D 11/101* (2013.01); *B41M 7/0081* (2013.01); *C09D 10/00* (2013.01); *C09D 11/30* (2013.01); *C09D 11/38* (2013.01)

(58) Field of Classification Search
CPC ....... C09D 11/101; C09D 11/30; C09D 11/38; C09D 10/00; B41M 7/0081
See application file for complete search history.

(56) References Cited

U.S. PATENT DOCUMENTS

2008/0255297 A1* 10/2008 Itami ..................... C08G 63/08
                                                                        524/547
2012/0287184 A1* 11/2012 Shimada ................ B41J 11/002
                                                                        347/9
(Continued)

FOREIGN PATENT DOCUMENTS

JP       08-324103       12/1996
JP       10-095175       4/1998
(Continued)

*Primary Examiner* — Yaovi M Ameh
(74) *Attorney, Agent, or Firm* — JCIPRNET

(57) ABSTRACT

Recordation and removal of an image that can be removed from a recording medium are facilitated with suitable workability.
An ink composition for forming an image using an ink jet scheme on a recording medium, and removing the image from the recording medium by dissolving the image by a solvent after having fixed the formed image by light irradiation, and an ink composition that is to become a base of an image layer formed on the recording medium using the ink jet scheme, and that is for removing the image layer from the recording medium by dissolving the ink composition by the solvent after having fixed the formed image layer by the light irradiation that are according to the present disclosure include a photocurable compound that is cured by receiving light irradiation and dissolved by a solvent while in a cured state.

6 Claims, 5 Drawing Sheets

(51) Int. Cl.
*C09D 11/30* (2014.01)
*C09D 11/38* (2014.01)
*B41M 7/00* (2006.01)

(56) References Cited

U.S. PATENT DOCUMENTS

| | | | | |
|---|---|---|---|---|
| 2013/0065029 A1* | 3/2013 | Fujii | ............... | C09D 11/101 428/195.1 |
| 2013/0345358 A1* | 12/2013 | Findlay | ............... | C08F 2/38 524/558 |
| 2014/0043386 A1* | 2/2014 | Saita | ............... | B41J 11/002 347/15 |
| 2015/0010722 A1* | 1/2015 | Yamada | ............ | C09D 11/10 428/35.7 |

FOREIGN PATENT DOCUMENTS

| | | | | |
|---|---|---|---|---|
| JP | 2000-089630 | | 3/2000 | |
| JP | 2002-020671 | * | 1/2002 | ............ C09D 11/10 |
| JP | 2006-144180 | | 6/2006 | |

* cited by examiner

FIG.2(a)
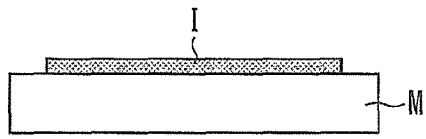
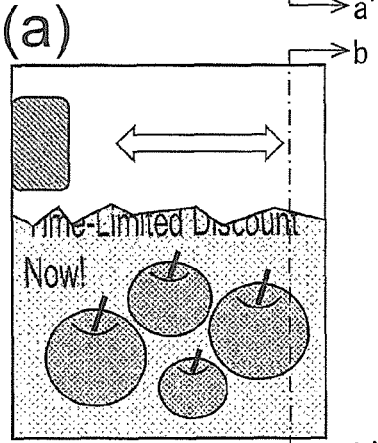
FIG.2(b)
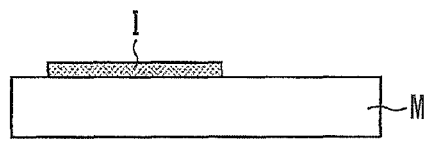
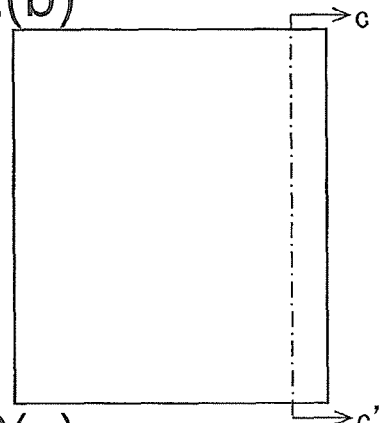
FIG.2(c)
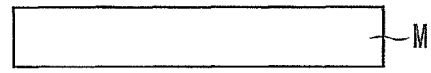

INK COMPOSITION, INK JET RECORDING DEVICE, INK JET RECORDING METHOD, AND METHOD FOR REUSING RECORDING MEDIUM

CROSS REFERENCE TO RELATED APPLICATIONS

This application claims the priority benefits of Japanese Patent Application No. 2014-195854, filed on Sep. 25, 2014, 2014-195856, filed on Sep. 25, 2014, and 2015-152937, filed on Jul. 31, 2015. The entirety of each of the above-mentioned patent applications is hereby incorporated by reference herein and made a part of this specification.

TECHNICAL FIELD

The present disclosure relates to an ink composition for forming an image using an ink jet scheme on a recording medium, and removing the image from the recording medium by dissolving the image by a solvent after having fixed the formed image by light irradiation, and a method for reusing the recording medium, as well as an ink composition that is to become a base of an image layer formed on the recording medium using the ink jet scheme, and that is for removing the image layer from the recording medium by dissolving the ink composition by the solvent after having fixed the formed image layer by the light irradiation, an ink jet recording device, an ink jet recording method, and a method for reusing the recording medium.

DESCRIPTION OF THE BACKGROUND ART

Generally, recordation onto a recording medium by a recording device is irreversible, and the recording medium cannot be used repeatedly by removing a once-recorded image. In considering environmental load, it is desirable to reuse the recording medium especially for displays of which contents are changed in short period of time. Further, if the recordation of image can be performed again after having removed the once-recorded image, handling can be afforded as to printing errors and the like on the recording medium.

Thus, Patent Document 1 discloses a recording medium that enables to perform image recordation onto the recording medium and image removal from the recording medium in a reversible manner. Patent Document 1 discloses a recording medium in which a state where color is relatively exhibited and a state where the color is relatively extinguished are formed according to a difference in heating temperature and/or cooling speed after heating. In this recording medium, an image is recorded by once heating the recording medium and rapidly cooling the same by a thermal head and the like, and the image is removed by gradually cooling the recording medium from its heated state.

However, in the recording medium disclosed in Patent Document 1, full color printing and high resolution printing and the like are difficult. Thus, Patent Document 2 discloses a technique in which a removable organic film is formed on a recording medium surface, and an image formed by an electrophotographic scheme, a heat transfer scheme, or an ink jet scheme, etc. on a surface of this organic film is removed altogether with the organic film.

Further, Patent Document 3 discloses a technique in which a surface layer containing hydroxypropyl cellulose as a resin component is formed on a surface of a recording medium, an image is formed by water-color ink on the surface of the recording medium, and thereafter the recording medium is washed by water to remove the recorded image.

It should be noted that Patent Document 4 discloses a technique in which an image is recorded by performing printing on a fabric with a textile printing ink-jet ink containing water-soluble compound which can be polymerized by external energy beam irradiation, thereafter generating polymeric compound by an irradiation of external energy beam onto the water-soluble compound, and undergoing a water washing process of removing the unreacted, polymerizable water-soluble compound and the polymeric compound from the fabric.

This technique removes both the water-soluble compound contained in the textile printing ink-jet ink and the polymeric compound generated by the external energy beam irradiation, and it differs from the technique of removing an image printed on the fabric.

PRIOR ART DOCUMENT

Patent Document

Patent Document 1: Japanese Patent Application Publication No. H10-95175 (JP H10-95175 A, published on Apr. 14, 1998).

Patent Document 2: Japanese Patent Application Publication No. 2000-89630 (JP 2000-89630 A, published on Mar. 31, 2000).

Patent Document 3: Japanese Patent Application Publication No. H8-324103 (JP H8-324103 A, published on Dec. 10, 1996).

Patent Document 4: Japanese Patent Application Publication No. 2006-144180 (JP 2006-144180 A, published on Jun. 8, 2006).

SUMMARY

However, the techniques disclosed in Patent Document 2 and Patent Document 3 have low workability of image recordation on the recording medium and image removal from the recording medium. Specifically, in the technique disclosed in Patent Document 2, in recording the image on the recording medium, a work to heat the recording medium at 40 to 100 degrees Celsius is necessary after formation of an organic film on a recording medium surface to dry this organic film. Further, in removing the image from the recording medium, a work of immersing in water or organic solvent is necessary.

Further, in the technique disclosed in Patent Document 3, a work to form a surface layer on a recording medium in advance is necessary. Further, in removing the image from the recording medium, a work of immersing in water is necessary.

Thus, the present disclosure has been made in view of the above problem, and an ink composition for forming an ink layer on a recording medium using an inkjet scheme and removing the ink layer from the recording medium by dissolving the ink layer by a solvent after having fixed the formed ink layer by light irradiation, an ink jet recording device, an ink jet recording method, and a method for reusing the recording medium, which can facilitate recordation and removal of images removable from the recording medium with satisfactory workability, are hereby provided.

To solve the above problem, an ink composition for forming an ink layer (image) using an ink jet scheme on a recording medium and removing the image from the recording medium by dissolving the ink layer (image) by a solvent after having fixed the formed ink layer (image) by light irradiation according to an aspect of the present disclosure (which is hereafter referred simply as an "ink composition according to one aspect of the present disclosure") contains a photocurable compound that is cured by receiving light irradiation and dissolved by a solvent while being in a cured state.

When an image is recorded on a recording medium by the ink composition according to one aspect of the present disclosure, the ink composition discharged and cured on the recording medium can be removed wholly by a solvent. That is, by using the ink composition according to one aspect of the present disclosure, the image can be recorded by a normal recording step, so that a new step in addition to the normal recording step for recording the removable image is not necessary, and work process therefor is simple. Further, since the ink composition according to one aspect of the present disclosure can be cured by light, it has fast-drying property, which enables good workability.

Further, when the image is to be removed from the recording medium, the image can be removed simply by wiping the ink composition on the recording medium by a soaked member in which the solvent has been soaked, so that a step of immersing the recording medium is not necessary. That is, the work of removing the image from the recording medium is also easy for a user. Accordingly, the ink composition according to one aspect of the present disclosure can facilitate the recordation and removal of the removable image easily from the recording medium with satisfactory workability.

Further, the ink composition according to one aspect of the present disclosure further contains a chain transfer agent.

According to the above configuration, since a molecular weight of the ink can be suppressed, ink can more easily be dissolved by the solvent, and the image can more easily be removed from the recording medium.

Further, in the ink composition according to one aspect of the present disclosure, the solvent for dissolving the ink composition is water, a weakly alkaline aqueous solution, or an organic solvent.

According to the above configuration, the image can be removed by simply wiping the ink on the recording medium by the soaked member in which any one of water, a weakly alkaline aqueous solution, and an organic solvent has been soaked.

Further, to solve the above problem, a method for reusing a recording medium according to one aspect of the present disclosure forms an image by using an ink jet scheme on a recording medium using the ink containing a photocurable compound cured by receiving light irradiation and dissolved by a solvent while being in a cured state, and the image is removed from the recording medium by dissolving the ink by the solvent after having fixed the formed image by light irradiation.

According to the above method, the image can be removed simply by wiping the ink on the recording medium by a soaked member in which the solvent has been soaked, so that the step of immersing the recording medium in the solvent is not necessary. That is, the work of removing the image from the recording medium is also easy for a user. Accordingly, the method for reusing the recording medium according to one aspect of the present disclosure can facilitate the removal of the removable image easily from the recording medium with satisfactory workability.

Furthermore, to solve the above problem, an ink composition that is to be a base of an image layer formed by using the ink jet scheme on a recording medium and that is for removing the image layer from the recording medium by dissolving the image by a solvent after having fixed the formed image layer by light irradiation according to one aspect of the present disclosure (which is hereafter referred simply as an "ink composition according to one aspect of the present disclosure") contains a photocurable compound that is cured by receiving light irradiation and dissolved by a solvent while being in a cured state.

By forming a coating layer that is to be the base of the image layer by the ink composition according to one aspect of the present disclosure, the image is recorded on the recording medium by forming the image layer on the coating layer, so that the image layer is removed altogether by wholly removing the coating layer on the recording medium, as a result of which the image can be removed. That is, by using the ink composition according to one aspect of the present disclosure, the coating layer can be formed by a normal recording step, so that a new step in addition to the normal recording step for recording the removable image is not necessary, and work process therefor is simple. Further, since the ink composition according to one aspect of the present disclosure can be cured by light, it has fast-drying property, which enables good workability.

Further, when the image is to be removed from the recording medium, the image can be removed simply by wiping the coating layer and the image layer on the recording medium by a soaked member in which the solvent has been soaked, so that the step of immersing the recording medium in the solvent is not necessary. That is, the work of removing the image from the recording medium is also easy for a user. Accordingly, the ink composition according to one aspect of the present disclosure can facilitate the recordation and removal of the removable image easily from the recording medium with satisfactory workability.

Further, the ink composition according to one aspect of the present disclosure further contains a chain transfer agent.

According to the above configuration, since a molecular weight of the ink can be suppressed, ink can more easily be dissolved by the solvent, and the image can more easily be removed from the recording medium.

Further, in the ink composition according to one aspect of the present disclosure, the solvent used for dissolving the ink composition is water, a weakly alkaline aqueous solution, or an organic solvent.

According to the above configuration, the image can be removed by simply wiping the ink on the recording medium by the soaked member in which any one of water, a weakly alkaline aqueous solution, and an organic solvent has been soaked.

Further, to solve the above problem, an ink jet recording device according to one aspect of the present disclosure includes a recording head that forms a coating layer on a recording medium by first ink that is cured by receiving light irradiation and dissolved by a solvent while in a cured state, and forms an image layer on the coating layer by second ink; and an irradiation unit that irradiates the first ink on the recording medium with light.

According to this configuration, a coating layer is formed by the first ink that is dissolved by the solvent while in the cured state, the image is recorded on the recording medium by forming the image layer formed of the second ink on the coating layer, so that the image layer is removed altogether by wholly removing the coating layer on the recording medium by the solvent, as a result of which the image can be removed. Since the coating layer can be formed by a normal recording step, a new step in addition to the normal recording step is not necessary, and work process therefor is simple. Further, the first ink discharged from the recording head is cured by the light from the irradiation unit at the same time as being discharged onto the recording medium, so that a step of drying the first ink is also not necessary. Further, since the coating layer formed of the first ink that is dissolved by the solvent while being in the cured state is printed and formed into an applied film by the recording head, selective formation of the coating layer only at a portion where effective pixels are in the image to be recorded, or any voluntary portion of the image, of which removal may be desired after having recorded the same, is possible. Due to this, by using the first ink only at the necessary portions, reduction of utility cost of the first ink and easiness of the removal of the coating layer can be improved.

Further, when the image is to be removed from the recording medium, the image can be removed simply by wiping the coating layer and the image layer on the recording medium by a soaked member in which the solvent has been soaked, so that the step of immersing the recording medium in the solvent is not necessary. That is, the work of removing the image from the recording medium is also easy for a user. Accordingly, the ink jet recording device according to one aspect of the present disclosure can facilitate the recordation of the removable image easily from the recording medium with satisfactory workability.

Further, in an ink jet recording device according to one aspect of the present disclosure, the recording head forms the image layer by halftone printing.

According to the above configuration, with gaps formed at a voluntary interval in the image layer, the solvent enters the gaps and easily reaches the coating layer. As a result, the coating layer can effectively be removed by the solvent.

Further, in an ink jet recording device according to one aspect of the present disclosure, a size of a printable range of the coating layer is equal to or larger than a size of a printable range of the image layer.

According to the above configuration, the coating layer can effectively be removed by the solvent.

Further, to solve the above problem, an ink jet recording method according to one aspect of the present disclosure includes forming a coating layer on a recording medium by first ink that is cured by receiving light irradiation and dissolved by a solvent while in a cured state, and at the same time forming an image layer on the coating layer by second ink; and irradiating the first ink on the recording medium with light.

According to the above method, an advantage similar to that of the ink jet recording device according to one aspect of the present disclosure can be achieved.

Further, to solve the above problem, in a method for reusing the recording medium according to one aspect of the present disclosure, a coating layer is formed on the recording medium by first ink that is cured by receiving light irradiation and dissolved by a solvent while in a cured state using an ink jet scheme, an image layer is formed on the coating layer by second ink using the ink jet scheme, and the image layer is removed from the recording medium by dissolving the coating layer by the solvent after having fixed the formed image layer by the light irradiation.

According to the above method, the image can be removed simply by wiping the first ink (coating layer) on the recording medium by a soaked member in which the solvent has been soaked, so that the step of immersing the recording medium in the solvent is not necessary. That is, the work of removing the image from the recording medium is also easy for a user. Accordingly, the method for reusing the recording medium according to one aspect of the present disclosure can facilitate the removal of the removable image easily from the recording medium with satisfactory workability.

Recordation and removal of an image that can be removed from a recording medium are facilitated with suitable workability.

BRIEF DESCRIPTION OF THE DRAWINGS

FIGS. 2(a), 2(b), and 2(c) are front and cross sectional diagrams of a medium for steps from recordation of an image on the medium to removal of the image.

DETAILED DESCRIPTION OF EMBODIMENTS

First Embodiment

Figure 1:
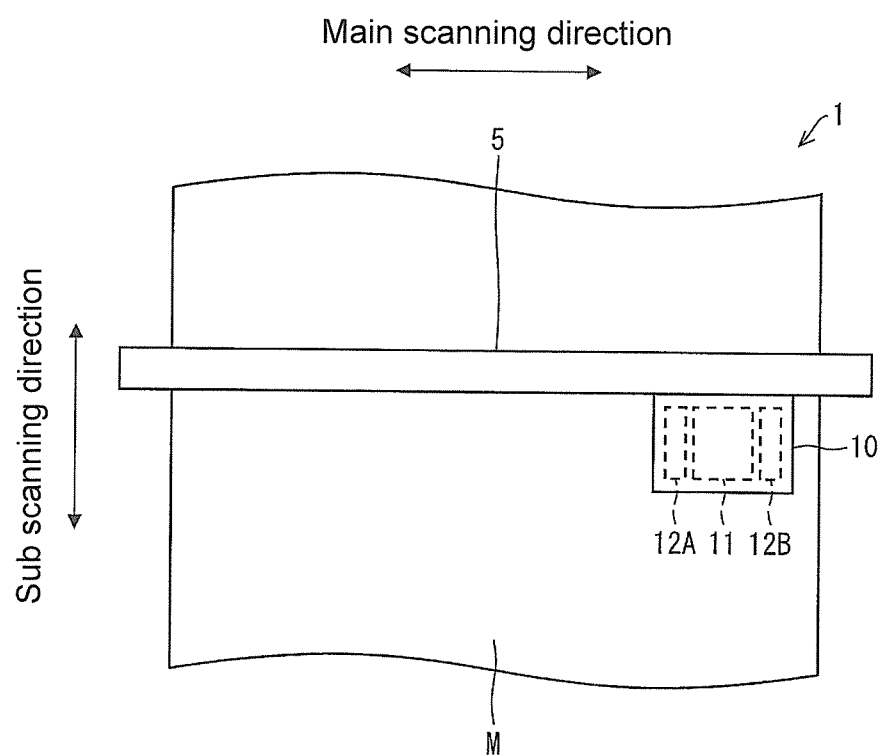
FIG. 1 is a schematic diagram of an ink jet recording device according to a first embodiment of the present disclosure.

Hereinbelow, a first embodiment of the present disclosure will be described.

(Ink Composition A)

An ink composition A for forming an image using an ink jet scheme on a recording medium and removing the image from the recording medium by dissolving the image by a solvent after having fixed the formed image by light irradiation according to the present disclosure (which is hereafter referred simply as an "ink composition A according to the present disclosure") contains a photocurable compound that is cured by receiving light irradiation and dissolved by a solvent while being in a cured state.

[Photocurable Compound]

As the photocurable compound, for example, monomers that are cured by light (photopolymerization) and dissolved by a solvent while being in a cured state (decomposition) can be exemplified. Among such, monomers that are cured by ultraviolet ray (photopolymerization) and dissolved by a solvent while being in a cured state (decomposition) can be exemplified. As the solvent for dissolution, water is preferable from the viewpoint of environmental burden and easiness of handling, etc., so that water-soluble photocurable compound is more preferable as the photocurable compound.

As the water-soluble photocurable compound, for example, amide-based compound, polyol, C5 to 15 hydroxyl group-containing (meth)acrylate, hydroxyl group-containing (meth)acrylate with a number-average molecular weight of 200 to 1000, N, N-dimethyl alkyl (meth)acrylate including alkyl group with carbon number 2 to 3, salt thereof, (meth)acrylic ester with polyhydric alcohol, (meth)acrylic ester of glycidyl ether of polyhydric alcohol, (meth)acrylic ester of polyethylene glycol, (meth)acrylic ester of ethylene oxide-added compound of polyhydric alcohol, reactant of polybasic acid anhydride and hydroxyl group-containing (meth)acrylic ester, morpholine acrylate, ethoxylated polypropylene glycol, #700 dimethacrylate, ethoxylated glycerine triacrylate, ethoxylated pentaerythritol tetraacrylate, polyethylene glycol #400 diacrylate, polyethylene glycol #600 diacrylate, acryloylmorpholine, and the like may be exemplified.

Among those exemplified above, amide-based compound is preferable, and at least one type selected from the group consisting of acryl amide-based compounds containing one vinyl group, including (meth)acryl amide compounds and N-substituted compounds thereof is more preferable. The group consisting of acryl amide-based compounds containing one vinyl group, including (meth)acryl amide compounds and N-substituted compounds thereof, has higher adhesiveness to the medium, and extremely high solubility to water, so that a residual amount of resin on the medium can further be reduced.

In a case of using a printed medium at a place where it may become wet, such as outdoors and the like, it is preferable to use light-curing resin that is dissolved by a weakly alkaline aqueous solution or an organic solvent after having been cured.

[Solvent for Dissolving Cured Ink Composition A]

The solvent for dissolving ink composition A according to the present disclosure is for dissolving the ink composition A in the state of having been cured by light. For example, water, a weakly alkaline aqueous solution, an organic solvent and the like may be exemplified. As the weakly alkaline aqueous solution, hydrogen sodium carbonate aqueous solution, caustic soda aqueous solution or the like may be used, and as the organic solvent, ethanol, or alcohol such as isopropyl alcohol and the like may be used.

[Chain Transfer Agent]

The chain transfer agent contained in the ink composition A according to the present disclosure is not particularly limited so long as it is a compound that can adjust the molecular weight of a polymer. By combining the chain transfer agent, the molecular weight of the cured object is prevented from being in excess upon photocuring the ink composition A by irradiation, and the water solubility of the cured object is thereby improved.

A preferable specific example of the chain transfer agent may exemplify thiol compounds such as 2-mercaptobenzothiazole, and γ-mercaptoxy-propyl-trimethoxysilane, 2,4-diphenyl-4-methyl-pentene, and the like.

The chain transfer agent is combined in the ink composition A according to the present disclosure relative to 100 mass % of an entire ink amount preferably by 0.1 to 5 mass %, more preferably 0.2 to 4 mass %, and most preferably 0.3 to 3 mass %. This is for suitable water solubility of the cured object.

[Colorant]

The ink composition A according to the present disclosure may include colorants for expressing desired colors. As the colorant, publicly known pigments, dyes and the like may be exemplified. As the pigments, for example, publicly known pigments such as yellow, magenta, cyan, carbon black and the like may be exemplified.

[Photocuring Initiator]

A photocuring initiator contained in the ink composition A according to the present disclosure simply needs to be capable of starting curing of the photocurable compound by light irradiation thereon, and for example, a photopolymerization initiator may be exemplified. As the photopolymerization initiator, there is no particular limitation so long as it commences the polymerization of the photocurable compound by the light irradiation thereon. As a method of use of the photopolymerization initiator, one type of photopolymerization initiators may be used, two or more types thereof may be used, or a photopolymerization initiator and a sensitizer may be used. Selection, combination, and mixing ratio of the primary photopolymerization initiator and sensitizer may suitably be selected according to the photocurable compound to be used, and a device to be used, and the like.

The primary photopolymerization initiator may be 1-hydroxycyclohexylphenylketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler ketone, benzoinpropylether, benzoinethylether, benzyl dimethylketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-{4-(methylthio)phenyl}-2-morpholino-propane-1-one, 2,4,6-trimethylbenzoyldiphenylphosphine oxide, bis-(2,6-dimethoxybenzoyl)-2,4,4-trimethylpentylphosphine oxide, bis(2,4,6-trimethylbenzoyl)-phenylphosphine oxide, and the like.

[Other Components]

The ink composition A according to the present disclosure may contain components other than the aforementioned photocurable compound, photocuring initiator, and chain transfer agent. For example, additives such as a sensitizer, and water-soluble solvent may be exemplified.

[Sensitizer]

There is no particular limitation to the sensitizer so long as it can commence the reaction of the photocuring initiator.

As primary sensitizers, amine-group (aliphatic amine, aromatic group-containing amine, piperidine, and the like), urea (aryl group, o-trylthiourea, and the like), sulfur compound (soluble salt of sodium diethyldithiophosphate, aromatic sulfinic acid, and the like), nitrile compound (N, N-disubstituted p-aminobenzonitril, and the like), phosphorus compound (tri-n-butylphosphine, sodium diethyldithiophosphide, and the like), nitrogen compound (Michler ketone, N nitrohydroxylamine derivative, oxazolizine compound, tetrahydro1,3 oxazine compound, formaldehyde, or condensate of acetaldehyde and diamine, and the like), chlorine compound (carbon tetrachloride, hexachloroethane, and the like), high polymer amine of reaction product of epoxy resin and amine, triethanolaminetriacrylate, and the like may be exemplified.

[Additive]

As additives other than the components explained above, publicly known surfactants, preservatives, antifungal agents, pH control agents, viscosity control agents, dispersants and the like may be added according to needs.

As the surfactants, all of cationic, anionic, amphoteric, and nonionic surfactants may be used. As the cationic surfactant, aliphatic amine salt, aliphatic quaternary ammonium salt, benzalconium salt, benzethonium chloride, pyridinium salt, imidazolinium salt and the like may be exemplified.

As the anionic surfactant, fatty acid soap, N-acyl-N-methylglycine salt, N-acyl-N-methyl-β-alanine salt, N-acylglutamic acid salt, alkylethercarboxylic acid salt, acyl peptide, alkylsulfonate, alkylbenzene sulfonate, alkylnaphthalene sulfonate, dialkylsulfosuccinic acid ester salt, alkylsulfoacetate, α-olefine sulfonate, N-acylmethyltaurine, sulfonated oil, higher alcohol sulfate salt, secondary higher alcohol sulfate salt, alkylether sulfate, secondary higher alcohol ethoxysulfate, polyoxyethylene alkylphenylethersulfate, monoglysulfate, fatty acid alkylol amide sulfate salt, alkyletherphosphate ester salt, alkylphosphate ester salt may be exemplified.

As the amphoteric surfactant, carboxybetaine type, sulfobetaine type, aminocarboxylic acid salt, imidazoliniumbetaine and the like may be exemplified.

As the nonionic surfactant, polyoxyethylene alkylether, polyoxyethylene secondary alcohol ether, polyoxyethylene alkylphenylether (for example, EMULGEN 911 by Kao Corporation), polyoxyethylene sterolether, polyoxyethylene lanonine derivative, polyoxyethylene polyoxypropylenealkylether (for example NEWPOL PE-62 by Sanyo Chemical Industries), polyoxyethylene glycerin-fatty acid ester, polyoxyethylene castor oil, hardened castor oil, polyoxyethylene sorbitan-fatty acid ester, polyoxyethylene sorbitol-fatty acid ester, polyethylene glycol-fatty acid ester, fatty acid monoglyceride, polyglycerin-fatty acid ester, sorbitan-fatty acid ester, propylene glycol-fatty acid ester, sucrose-fatty acid ester, fatty acid alkanolamide, polyoxyethylene fatty acid amide, polyoxyethylene alkylamine, alkylamine oxide, acetylene glycol, acetylene alcohol and the like may be exemplified.

In a case of using these surfactants, they may be used singly or in combination of two or more types. Further, by adding them for example within a range of 0.001 to 1.0 mass % relative to an entire ink amount, a surface tension of the ink composition A can arbitrarily be adjusted, which is preferable.

To maintain long-term stability of the ink composition A, a preservative and an antifungal agent may be added to the ink composition A. As the preservative and antifungal agent, aromatic halogen compound (for example, Preventol CMK by Lanxess AG), methylene dithiocyanate, halogenated nitrogen-containing sulfur compound, 1,2-benzisothiazolin-3-one (for example, PROXEL GXL by LONZA Group Ltd.) and the like may be exemplified. The present disclosure is not limited to these.

In an embodiment in which the ink composition A according to the present disclosure includes disperse dyes, the disperse dyes are mixed with a dispersant, humectant, medium, and voluntary additives and are dispersed by using a disperser.

The humectant preferable for the dispersion of the disperse dyes is sodium dodecylbenzene sulfonate, sodium 2-ethylhexylsulfosuccinate, alkylnaphthalene sulfonate soda, ethylene oxide adduct of phenol, ethylene oxide adduct of acetylenediol and the like.

As the dispersant, for example, formalin condensate of sodium creosote oil sulfonate (for example, DEMOL C by Kao Corporation), formalin condensate of sodium cresol sulfonate and sodium 2-naphtol-6-sulfonate, formalin condensate of sodium cresol sulfonate, formalin condensate of sodium phenol sulfonate, formalin condensate of sodium β-naphtol sulfonate, formalin condensate of sodium β-naphthalene sulfonate (for example, DEMOL N by Kao Corporation)) and sodium β-naphtol sulfonate, lignin sulfonate (for example, VANILLEX RN by Nippon Paper Industries Co., Ltd.), sodium paraffin sulfonate (for example, Efcol 214 by Matsumoto Yushi-Seiyaku Co., Ltd), copolymer of α-olefine and maleic anhydride (for example, Floren G-700 by Kyoeisha Chemical Co., Ltd.) and the like may be exemplified. These dispersants may be used singly or in combination.

(Ink Jet Recording Device 1)

Hereinbelow, one embodiment of an ink jet recording device for discharging the ink composition A according to the present disclosure will be described with reference to FIG. 1. FIG. 1 is a schematic diagram of the ink jet recording device 1.

The ink jet recording device 1 includes a Y-bar 5 and a carriage 10. The ink jet recording device 1 performs recordation on a medium M (recording medium), and in FIG. 1, the medium M is mounted on a mounting stand (not shown).

[Y-Bar 5]

The Y-bar 5 extends in one direction. The direction along which the Y-bar 5 extends is a main scanning direction of the ink jet recording device 1. In other words, the main scanning direction is one direction parallel to a planar direction of the mounting stand. It should be noted that a direction that is vertical to the main scanning direction and parallel to the planar direction of the mounting stand is a sub scanning direction. The medium M is transferred in the sub scanning direction.

[Carriage 10]

The carriage 10 is attached to the Y-bar 5, and moves back and forth in the main scanning direction. Due to this, the carriage 10 moves relative to the mounting stand, and as a result, a recording head 11 to be described later moves relative to the mounting stand. In the present embodiment, a configuration in which the recording head 11 moves in the main scanning direction and the medium M does not move in the main scanning direction will be described. However, the present disclosure is not limited to this, and the recording head 11 may be fixed and the medium M may move back and forth in the main scanning direction.

The carriage 10 includes the recording head 11, a left irradiation section 12A (irradiation unit), and a right irradiation section 12B (irradiation unit).

[Recording Head 11]

The recording head 11 discharges the ink onto the medium M. Specifically, a plurality of nozzle rows is formed in the recording head 11. The respective nozzle rows have a plurality of nozzles, and the ink is discharged from the respective nozzles.

As the ink, it simply needs to be cured by light radiated from the left irradiation section 12A and the right irradiation section 12B to be described later, and be dissolved by a solvent while being in a cured state, and the aforementioned ink composition A according to the present disclosure is suitably used.

To increase the solubility by the solvent, a chain transfer agent may be added to the ink. The chain transfer agent allows easier dissolution by the solvent due to the molecular weight of the ink being suppressed thereby.

[Left Irradiation Section 12A and Right Irradiation Section 12B]

The left irradiation section 12A and the right irradiation section 12B are for light irradiation onto the ink discharged from the recording head 11. The ink discharged from the recording head 11 is cured by the light radiated from the left irradiation section 12A and the right irradiation section 12B. As such light, it simply needs to be able to cure the ink discharged from the recording head 11. For example, if the ink is ultraviolet curing type of ink, it is preferable for the left irradiation section 12A and the right irradiation section 12B to radiate ultraviolet light.

The left irradiation section 12A and the right irradiation section 12B align along the main scanning direction, and are arranged so that the recording head 11 is arranged between the left irradiation section 12A and the right irradiation section 12B. Due to this, the left irradiation section 12A and the right irradiation section 12B move in the same direction as the moving direction of the recording head 11, that is, in the main scanning direction.

[Medium]

As for the medium M, it simply need to be of a material that does not allow the medium M to be deteriorated or be invaded by the solvent for dissolving the photocuring resin of the ink composition A that is used upon removing the image, and there is no limitation to the material thereof.

(Image Recordation and Image Removal)

Hereinbelow, an ink jet recording method and an ink removing method by the ink jet recording device 1 will be described in detail with reference to FIGS. 2(a) to 2(c). FIGS. 2(a) to 2(c) are front and cross sectional diagrams of the medium M for steps from recordation of an image on the medium M to removal of the image.

Firstly, when the medium M is transferred onto the mounting stand, the carriage 10 is moved back and forth along the Y-bar 5 in the main scanning direction, and the ink composition A according to the present disclosure is discharged as ink I from the nozzles formed on a lower surface of the recording head 11 so as to be adhered onto the medium M in a desired pattern.

When this scanning is performed, the left irradiation section 12A and the right irradiation section 12B mounted on the carriage 10 radiate light. Due to this, curing of the ink I discharged from the recording head 11 progresses, and the ink I comes to be in a state of sufficiently adhered onto the medium M. In other words, the ink I is cured so that the ink I is fixed on the medium M to a degree by which the printed matter as manufactured can be used for a desired purpose, for example, for a signboard.

When this scanning is finished, and the desired image is formed on the medium M as in FIG. 2(a), the medium M is transferred from the mounting stand. The above is the ink jet recording method by the ink jet recording device 1.

Next, in the case of removing the image formed on the medium M, as shown in FIG. 2(b), a soaked member (for example, cloth or the like) in which the solvent is soaked is used to wipe off the ink I on the medium M. Due to this, the solvent soaked in the soaked member dissolves the ink I fixed on the medium M, so that the ink I is removed from the medium M. Upon this removal, a temperature of the solvent may be increased from 30 degrees Celsius to a temperature lower than a boiling point of the solvent to increase the solubility of the ink I by the solvent as needed. Accordingly, as shown in FIG. 2(c), the image is removed from the medium M by completely removing the ink I from the medium M, and the medium M can be reused. This is one embodiment of a reuse method according to the present disclosure.

Accordingly, in the ink jet recording device 1, workability upon image recordation onto the medium M and image removal from the medium M is high. Specifically, since the image is recorded on the medium M by the ink that is dissolved by the solvent while being in the cured state, the ink cured by being discharged on the medium M can wholly be removed by the solvent. That is, since the image can be recorded by a normal recording step using the ink dissolved by the solvent while being in the cured state, a new step in addition to the normal recording step for recording the removable image is not necessary, and work process therefor is simple. Further, the ink discharged from the recording head 11 is cured by the light from the left irradiation section 12A and the right irradiation section 12B at the same time as being discharged onto the medium M, so that the workability is great with fast-drying property. Furthermore, a step of drying the ink is also not necessary.

Further, when the image is to be removed from the medium M, the image can be removed simply by wiping the ink on the medium M by the soaked member in which the solvent has been soaked, so that a step of immersing the medium M in the solvent is not necessary. That is, the work of removing the image from the medium M is also easy for a user. Accordingly, the ink jet recording device 1 can facilitate the recordation and removal of the removable image easily from the medium M with satisfactory workability.

By using such an ink jet recording method, the image can be removed by the specific solvent, so that the removal and storage of the image can arbitrarily be performed. Especially, it can suitably be used for cases of modifying the recorded image within a short period of time. Further, when the image is removed from the medium M, environmental friendliness can be achieved since the medium M can be reused. Further, the reuse of the medium M allows using expensive base material for the medium M.

Use Example

In the above, although a configuration in which the image is recorded on the medium M only by the ink I has been shown, the present disclosure is not necessarily limited to this. For example, a region on a part of the medium M may record the image by the ink I, and other regions may record the image by ink that is not dissolved by a solvent in a state of being cured by light. In other words, images may be formed on one medium M by plural types of ink including the ink I, containing different materials.

Figure 3:
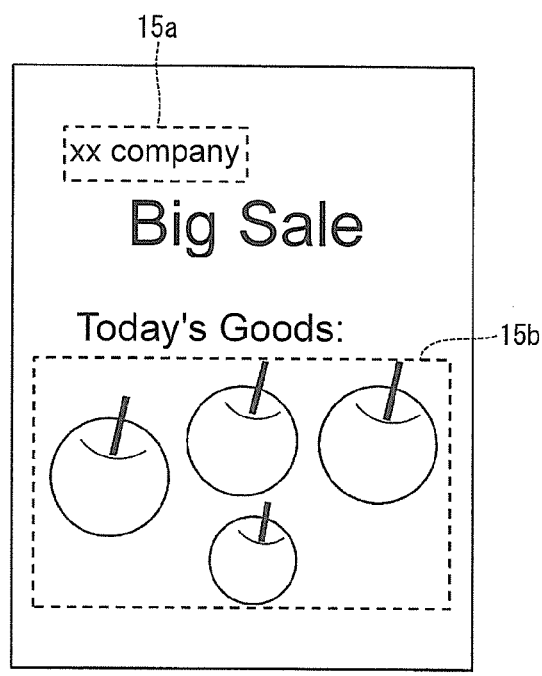
FIG. 3 is a front diagram of a medium according to a first embodiment of the present disclosure.

For example, in the case of a medium as shown in FIG. 3, images in a first region 15a and a second region 15b on the medium may be recorded by the ink I, and remaining regions may be recorded with other ink (ink that is not dissolved by a solvent in a state of being cured by light).

Due to this, the images in the first region 15a and the second region 15b can be removed by the specific solvent, so that the images in the first region 15a and the second region 15b can be changed. For example, a letter string "xx Company" in the first region 15a can be rewritten to another letter string (for example, a name of a different company). Further, an image of apples in the second region 15b can be changed to another image (for example, image of another type of food).

Accordingly, even in the case of rewriting some parts of the image on the medium, the ink I can suitably be used. In this case also, the environmental friendliness can be achieved since the medium M can be reused.

(Summary)

An ink composition A for forming an image using an ink jet scheme on a recording medium and removing the image from the recording medium by dissolving the image by a solvent after having fixed the formed image by light irradiation according to one aspect of the present disclosure (which is hereafter referred simply as an "ink composition A according to one aspect of the present disclosure") contains a photocurable compound that is cured by receiving light irradiation and dissolved by a solvent while being in a cured state.

When an image is recorded on the recording medium by the ink composition A according to one aspect of the present disclosure, the ink composition A discharged and cured on the recording medium can be removed wholly by the solvent. That is, by using the ink composition A according to one aspect of the present disclosure, the image can be recorded by a normal recording step, so that a new step in addition to the normal recording step for recording the removable image is not necessary, and work process therefor is simple. Further, since the ink composition A according to one aspect of the present disclosure can be cured by light, it has fast-drying property, with good workability.

Further, when the image is to be removed from the recording medium, the image can be removed simply by wiping the ink composition A on the recording medium by a soaked member in which the solvent has been soaked, so that a step of immersing the recording medium in the solvent is not necessary. That is, the work of removing the image from the recording medium is also easy for a user. Accordingly, the ink composition A according to one aspect of the present disclosure can facilitate the recordation and removal of the removable image easily from the recording medium with satisfactory workability.

Further, the ink composition A according to one aspect of the present disclosure further contains a chain transfer agent.

According to the above configuration, since a molecular weight of the ink can be suppressed, ink can more easily be dissolved by the solvent, and the image can more easily be removed from the recording medium.

Further, in the ink composition A according to one aspect of the present disclosure, the solvent for dissolving the ink composition A is water, a weakly alkaline aqueous solution, or an organic solvent.

According to the above configuration, the image can be removed by simply wiping the ink on the recording medium by the soaked member in which any one of water, a weakly alkaline aqueous solution, and an organic solvent has been soaked.

Further, the method for reusing a recording medium according to one aspect of the present disclosure forms an image by using an ink jet scheme on a recording medium using the ink containing a photocurable compound cured by receiving light irradiation and dissolved by a solvent while being in a cured state, and the image is removed from the recording medium by dissolving the ink by the solvent after having fixed the formed image by light irradiation.

According to the above method, the image can be removed simply by wiping the ink on the recording medium by a soaked member in which the solvent has been soaked, so that the step of immersing the recording medium is not necessary. That is, the work of removing the image from the recording medium in the solvent is also easy for a user. Accordingly, the method for reusing the recording medium according to one aspect of the present disclosure can facilitate the removal of the removable image easily from the recording medium with satisfactory workability.

Second Embodiment

Hereinbelow, a second embodiment of the present disclosure will be described.

(Ink Composition B)

An ink composition B that is to be a base of an image layer formed using an ink jet scheme on a recording medium and that is for removing the image layer from the recording medium by dissolving the image layer by a solvent after having fixed the formed image layer by light irradiation according to the present disclosure (which is hereafter referred simply as an "ink composition B according to the present disclosure") contains a photocurable compound that is cured by receiving light irradiation and dissolved by a solvent while being in a cured state.

[Photocurable Compound]

The description of the photocurable compound contained in the ink composition B is similar to that of the first embodiment.

[Solvent for Dissolving Cured Ink Composition B]

The solvent for dissolving cured ink composition B according to the present disclosure is for dissolving the ink composition B in the state of having been cured by light. The description of the solvent is similar to the description of the solvent for dissolving the ink composition A in the first embodiment.

[Chain Transfer Agent]

The description of the chain transfer agent contained in the ink composition B according to the present disclosure is similar to that of the first embodiment.

[Colorant]

The ink composition B according to the present disclosure may include colorants for expressing desired colors. As the colorant, publicly known pigments, dyes and the like may be exemplified. However, it is preferable that the base of the image layer does not deteriorate the color expression of the image layer. Due to this, as the pigments, for example, white or pearl is preferable. Further, metallic ink may be used, by mixing metallic powder of silver or aluminum, and the like. Further, clear ink without containing any colorant may be used. Further, it may have a color of a background of an image to be recorded, or a medium (recording medium) where the printing is to take place. It should be noted that in this description, "base of the image layer" means a coating layer formed on the medium, and an image layer is formed on the coating layer.

[Photocuring Initiator]

The description of the photocuring initiator contained in the ink composition B according to the present disclosure is similar to that of the first embodiment.

[Other Components]

The ink composition B according to the present disclosure may contain components other than the aforementioned photocurable compound, photocuring initiator, and chain transfer agent. The description of the other components is similar to that of the first embodiment.

(Ink Jet Recording Device 21)

Figure 4:
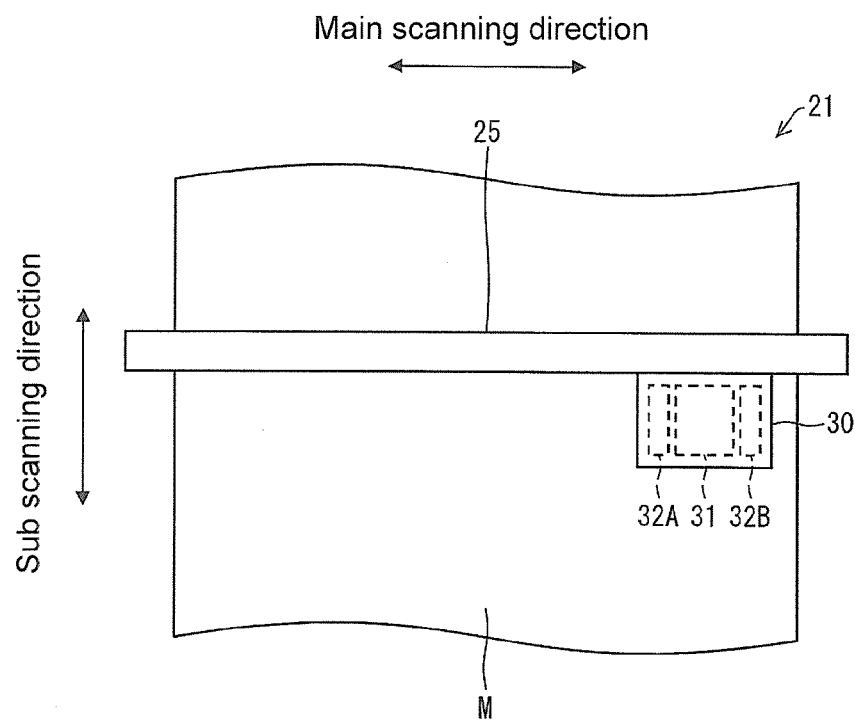
FIG. 4 is a schematic diagram of an ink jet recording device according to a second embodiment of the present disclosure.

Hereinbelow, one embodiment of an ink jet recording device according to the present disclosure will be described with reference to FIG. 4. FIG. 4 is a schematic diagram of the ink jet recording device 21.

The ink jet recording device 21 includes a Y-bar 25 and a carriage 30. The ink jet recording device 21 performs recordation on a medium M (recording medium), and in FIG. 4, the medium M is mounted on a mounting stand (not shown).

[Y-Bar 25]

The Y-bar 25 extends in one direction. The direction along which the Y-bar 25 extends is a main scanning direction of the ink jet recording device 21. In other words, the main scanning direction is one direction parallel to a planar direction of the mounting stand. It should be noted that a direction that is vertical to the main scanning direction and parallel to the planar direction of the mounting stand is a sub scanning direction. The medium M is transferred in the sub scanning direction.

(Carriage 30)

The carriage 30 is attached to the Y-bar 25, and moves back and forth in the main scanning direction. Due to this, the carriage 30 moves relative to the mounting stand, and as a result, a recording head 31 to be described later moves relative to the mounting stand. In the present embodiment, a configuration in which the recording head 31 moves in the main scanning direction and the medium M does not move in the main scanning direction will be described. However, the present disclosure is not limited to this, and the recording head 31 may be fixed and the medium M may move back and forth in the main scanning direction.

The carriage 30 includes the recording head 31, a left irradiation section 32A (irradiation unit), and a right irradiation section 32B (irradiation unit).

[Recording Head 31]

The recording head 31 discharges the ink onto the medium M. Specifically, a plurality of nozzle rows is formed in the recording head 31. The respective nozzle rows have a plurality of nozzles, and the ink is discharged from the respective nozzles. The recording head 31 includes nozzle rows for discharging first ink that is cured by receiving light irradiation and that is for forming a coating layer, and nozzle rows for discharging second ink that is cured by receiving light irradiation and that is for forming an image layer.

Figure 5A:
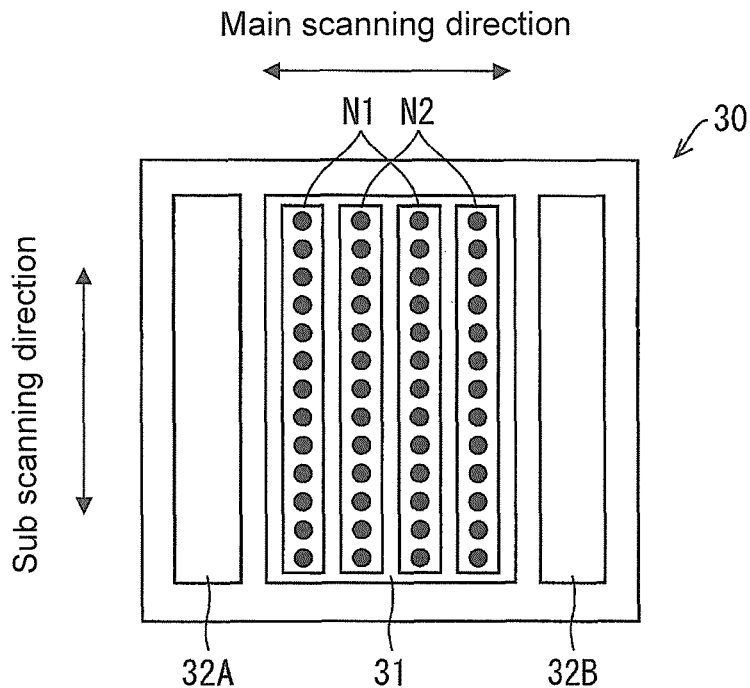
FIGS. 5(a) and 5(b) are diagrams showing arrangement examples of respective nozzle rows in a recording head according to the second embodiment of the present disclosure.
Figure 5B:
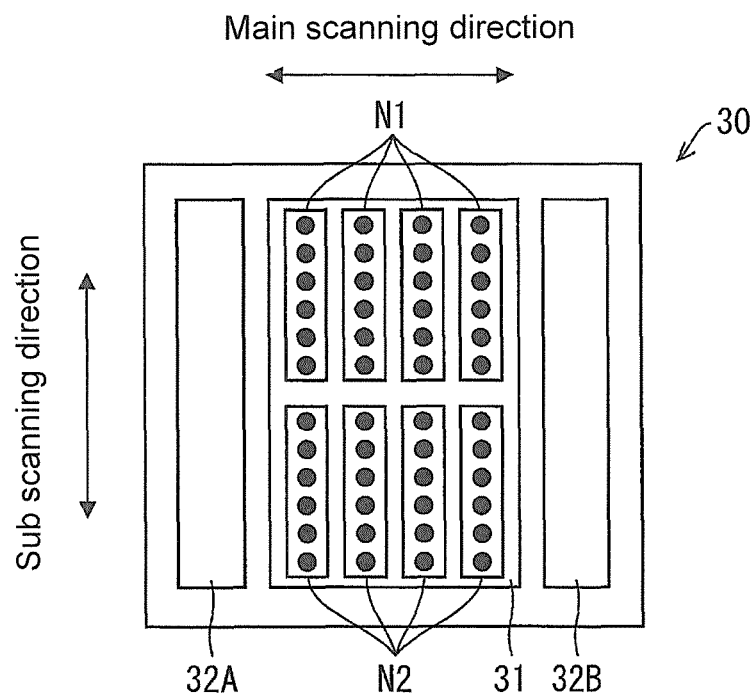

FIGS. 5(*a*) and 5(*b*) show arrangement examples of the respective nozzle rows in the recording head 31. For example, as shown in FIG. 5(*a*), plural nozzle rows N1 for discharging the first ink and plural nozzle rows N2 for discharging the second ink may be arranged along the main scanning direction. In this case, the coating layer and the image layer are formed on a surface of the medium M while the first ink is discharged from the nozzle rows N1 upon an outgoing movement of the recording head 31 in the main scanning direction, and the second ink is discharged from the nozzle rows N2 upon an incoming movement therein.

Alternatively, as shown in FIG. 5(*b*), the plural nozzle rows N1 for discharging the first ink and the plural nozzle rows N2 for discharging the second ink may be arranged separately in he sub scanning direction, and each of the plural nozzle rows N1 and the plural nozzle rows N2 may be arranged with those nozzle rows arranged along the main scanning direction. In this case, the coating layer and the image layer are formed simultaneously on the surface of the medium M by the medium M being transferred sequentially in the sub scanning direction by a pass width.

In the recording head 31, the first ink and the second ink are discharged from the respective nozzle rows accompanying the movement of the carriage 30, and the light is radiated from the left irradiation unit 32A and the right irradiation unit 32B to be described later, so that the coating layer is formed by the first ink applied on the surface of the medium M being cured, and the image layer is formed by the second ink applied on a surface of the coating layer being cured.

As the first ink, it simply needs to be cured by the light radiated from the left irradiation section 32A and the right irradiation section 32B to be described later, and be dissolved by a solvent while being in a cured state, and the aforementioned ink composition B according to the present disclosure is suitably used. It should be noted that as the colors of the first ink, clear, white, pearl, metallic, or background color of the image or the medium M may be adapted.

As the second ink, similar to the first ink, those cured by the light radiated from the left irradiation unit 32A and the right irradiation unit 32B to be described later can be used. For example, a photocuring type of ink containing a photocurable compound that is cured by light can be used. As such a photocuring type of ink, for example, ultraviolet curing type of ink containing ultraviolet curing compound may be exemplified.

However, the second ink is not limited to a photocuring type of ink. For example, water-soluble ink, latex ink in which resin is dissolved in water or organic solvent in a form of emulsion or suspension, solvent UV ink containing organic solvent (SUV ink), or solvent ink and the like may suitably be used.

The second ink may include colorants for expressing desired colors. As the colorant, publicly known pigments, dyes and the like may be exemplified. As the pigments, for example, publicly known pigments such as yellow, magenta, cyan, carbon black and the like may be exemplified.

To increase the solubility by the solvent, a chain transfer agent may be added to the first ink. The chain transfer agent allows easier dissolution by the solvent due to the molecular weight of the first ink being suppressed thereby.

[Left Irradiation Section 32A and Right Irradiation Section 32B]

The left irradiation section 32A and the right irradiation section 32B are for irradiating the first ink (or, first and second ink) discharged from the recording head 31 with light. The first ink (or, first and second ink) discharged from the recording head 31 is cured by the light radiated from the left irradiation section 32A and the right irradiation section 32B. As such light, it simply needs to be able to cure the first ink (or, first and second ink) discharged from the recording head 31. For example, if the first ink (or, first and second ink) is an ultraviolet curing type of ink, it is preferable for the left irradiation section 32A and the right irradiation section 32B to radiate ultraviolet light.

The left irradiation section 32A and the right irradiation section 32B align along the main scanning direction, and are arranged so that the recording head 31 is arranged between the left irradiation section 32A and the right irradiation section 32B. Due to this, the left irradiation section 32A and the right irradiation section 32B move in the same direction as the moving direction of the recording head 31, that is, in the main scanning direction.

[Medium]

As for the medium M, it simply need to be of a material that does not allow the medium M to be deteriorated or be invaded by the solvent for dissolving the photocuring resin of the first ink (coating layer) that is used upon removing the image, and there is no limitation to the material thereof.

(Image Recordation and Image Removal)

Hereinbelow, an ink jet recording method and an ink removing method by the ink jet recording device 21 will be described in detail with reference to FIGS. 6(*a*) to 6(*d*). FIGS. 6(*a*) to 6(*d*) are front and cross sectional diagrams of the medium M for steps from recordation of an image on the medium M to removal of the image.

Firstly, when the medium M is transferred onto the mounting stand, the carriage 30 is moved back and forth along the Y-bar 25 in the main scanning direction, and the ink composition B according to the present disclosure is discharged as the first ink C from the nozzles formed on a lower surface of the recording head 31 so as to be adhered onto the medium M in a desired pattern. Specifically, as shown in FIG. 6(*a*), the first ink C is applied to the surface of the medium M by the recording head 31 and the coating layer is formed thereby.

When this scanning is performed, the left irradiation section 32A and the right irradiation section 32B mounted on the carriage 30 radiate light. Due to this, curing of the first ink C discharged from the recording head 31 progresses, and the first ink C comes to be in a state of sufficiently adhered onto the medium M. In other words, the first ink C is cured so that the first ink C is fixed on the medium M to a degree by which the printed matter as manufactured can be used for a desired purpose, for example, for a signboard.

Next, the second ink I' for forming the image layer is discharged from the nozzles formed on the lower surface of the recording head 31 so as to be adhered onto the medium M in a desired pattern. Specifically, as shown in FIG. 6(b), the second ink I' is applied to the surface of the coating layer by the recording head 31 and the image layer is formed thereby.

When this scanning is performed, the left irradiation section 32A and the right irradiation section 32B mounted on the carriage 30 radiate light. Due to this, curing of the second ink I' discharged from the recording head 31 progresses, and the second ink I' comes to be in a state of sufficiently adhered onto the medium M. In other words, the second ink I' is cured so that the second ink I' is fixed on the medium M to a degree by which the printed matter can be used for a desired purpose.

It should be noted that as described above, the recording head 31 can comply with simultaneous printing of the coating layer and the image layer. The coating layer is formed by applying the first ink on the surface of the medium M by the medium M being transferred sequentially in the sub scanning direction by the pass width, and the image layer may be formed simultaneously by applying the second ink onto the surface of the coating layer.

Figure 6A:
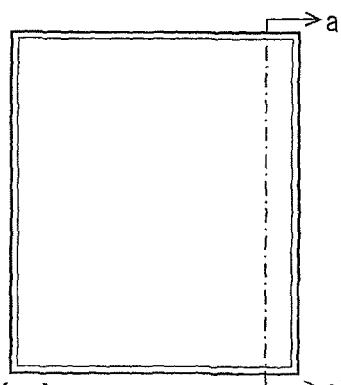
FIGS. 6(a), 6(b), 6(c), and 6(d) are front and cross sectional diagrams of a medium for steps from recordation of an image on the medium to removal of the image.
Figure 6A:
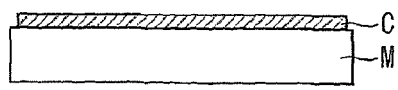
Figure 6B:
Figure 6B:
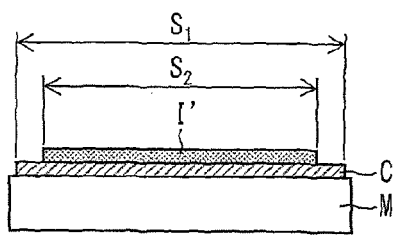

When this scanning is finished, and the desired image is formed on the medium M as shown in FIG. 6(b), the medium M is transferred from the mounting stand. The above is the ink jet recording method by the ink jet recording device 21.

Here, as shown in FIG. 6(a), a printable range $S_1$ of the coating layer preferably has a size equal to or larger than a printable range $S_2$ of the image layer (range of effective pixels in the image layer). Further, the coating layer is formed by solid printing (100% or more), and preferably has a thickness of 1 μm or more, and a number of layers thereof is preferably 1 or more layers. Due to this, the coating layer can effectively be removed by the solvent.

The image layer is preferably formed with gaps at a voluntary interval by being formed by halftone printing. The voluntary interval is an interval of about ½ of resolution of the ink jet recording device 21, for example. With gaps formed at the voluntary interval in the image layer, the solvent enters the gaps and easily reaches the coating layer. As a result, the coating layer can effectively be removed by the solvent.

Figure 6C:
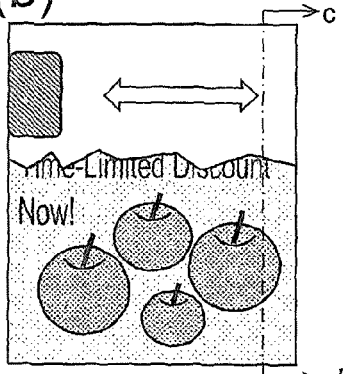
Figure 6C:
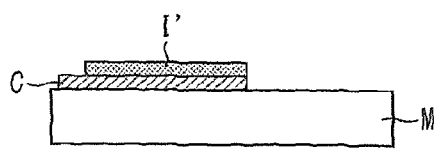
Figure 6D:
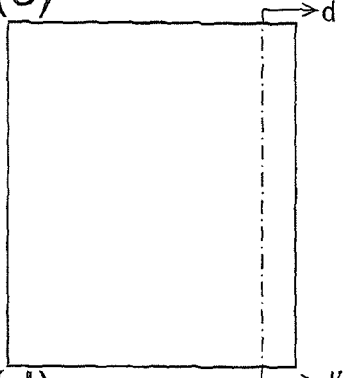
Figure 6D:
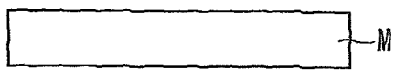

Next, in the case of removing the image forming on the medium M, as shown in FIG. 6(c), a soaked member (for example, cloth or the like) in which the solvent is soaked is used to wipe off the coating layer and the image layer on the medium M. Due to this, the solvent soaked in the soaked member reaches the first ink C fixed on the medium M and dissolves the first ink C, so that the coating layer and the image layer are removed from the medium M. Upon this removal, a temperature of the solvent may be increased from 30 degrees Celsius to a temperature lower than a boiling point of the solvent to increase the solubility of the first ink C (coating layer) by the solvent as needed. Accordingly, as shown in FIG. 6(d), the image is removed from the medium M by completely removing the coating layer and the image layer from the medium M, and the medium M can be reused.

Accordingly, in the ink jet recording device 21 according to the present embodiment, workability upon image recordation onto the medium M and image removal from the medium M is high. Specifically, a coating layer is formed by the first ink C that is dissolved by the solvent while in the cured state, the image is recorded on the medium M by forming the image formed of the second ink I' on the coating layer, so that the image layer is removed altogether by wholly removing the coating layer on the medium M by the solvent, as a result of which the image can be removed. That is, the coating layer can be formed by a normal recording step, so that a new step in addition to the normal recording step for recording the removable image is not necessary, and work process therefor is simple. Further, since the first ink C discharged from the recording head 31 is cured by the light from the left irradiation section 32A and the right irradiation section 32B at the same time as being discharged onto the medium M, the workability is great with fast-drying property. Furthermore, a step of drying the first ink C is also not necessary. Further, since the coating layer formed of the first ink C that is dissolved by the solvent while being in the cured state is printed and formed into an applied film by the recording head 31, selective formation of the coating layer only at a portion where effective pixels are in the image to be recorded, or any voluntary portion of the image is possible. Due to this, by using the first ink C only at the necessary portions, reduction of utility cost of the first ink C and easiness of the removal of the coating layer can be improved.

Further, when the image is to be removed from the medium M, the image can be removed simply by wiping the coating layer and the image layer on the medium M by the soaked member in which the solvent has been soaked, so that a step of immersing the medium M in the solvent is not necessary. That is, the work of removing the image from the medium M is also easy for a user. Accordingly, the ink jet recording device 21 according to the present embodiment can facilitate the recordation and removal of the removable image easily from the medium M with satisfactory workability.

By using such an ink jet recording method, an image can be removed by a specific solvent, so that the removal and storage of the image can arbitrarily be performed. Especially, it can suitably be used for cases of modifying the recorded image within a short period of time. Further, when an image is removed from a medium M, environmental friendliness can be achieved since the medium M can be reused. Further, the reuse of the medium M allows using expensive base material for the medium M.

In the above ink jet recording method, since the image layer can become removable by simply forming the removable coating layer on the medium M, various types of ink can be used upon the formation of the image layer.

Use Example

In the above, although a configuration in which the coating layer made of the first ink C is formed on the front surface of the media M has been shown, the present disclosure is not necessarily limited to this. As described above, the coating layer may be formed only at a voluntary portion within the image to be recorded. For example, the coating layer may be formed by the first ink C at a partial region on the medium M, and the coating layer may not be formed in other regions.

For example, in a case of the medium as shown in FIG. 3, a first region 15a and a second region 15b on the medium may have the coating layer formed by the first ink C, and the coating layer may not be formed in other regions, and the image formed of the second ink I' may be formed on the medium on which the coating layer has been formed in the first region 15a and the second region 15b.

Due to this, the images in the first region 15a and the second region 15b can be removed by the specific solvent, so that the images in the first region 15a and the second region 15b can be changed. For example, a letter string "xx Company" in the first region 15a can be rewritten to another letter string (for example, a name of a different company). Further, an image of apples in the second region 15b can be changed to another image (for example, image of another type of food).

Accordingly, even in the case of rewriting only some parts of the image on the medium, the first ink C can suitably be used. In this case also, the environmental friendliness can be achieved since the medium M can be reused.

(Summary)

An ink composition B to be a base of an image layer formed using an ink jet scheme on a recording medium and that is for removing the image layer from the recording medium by dissolving the image layer by a solvent after having fixed the formed image layer by light irradiation according to one aspect of the present disclosure (which is hereafter referred simply as an "ink composition B according to one aspect of the present disclosure") contains a photocurable compound that is cured by receiving light irradiation and dissolved by a solvent while being in a cured state.

By forming a coating layer that is to be the base of the image layer by the ink composition B according to one aspect of the present disclosure, the image is recorded on the recording medium by forming the image layer on the coating layer, so that the image layer is removed altogether by wholly removing the coating layer on the recording medium by the solvent, as a result of which the image can be removed. That is, by using the ink composition B according to one aspect of the present disclosure, the coating layer can be formed by a normal recording step, so that a new step in addition to the normal recording step for recording the removable image is not necessary, and work process therefor is simple. Further, since the ink composition B according to one aspect of the present disclosure can be cured by light, it has fast-drying property, which enables good workability.

Further, when the image is to be removed from the recording medium, the image can be removed simply by wiping the coating layer and the image layer on the recording medium by a soaked member in which the solvent has been soaked, so that the step of immersing the recording medium in the solvent is not necessary. That is, the work of removing the image from the recording medium is also easy for a user. Accordingly, the ink composition B according to one aspect of the present disclosure can facilitate the recordation and removal of the removable image easily from the recording medium with satisfactory workability.

Further, the ink composition B according to one aspect of the present disclosure further contains a chain transfer agent.

According to the above configuration, since a molecular weight of the ink can be suppressed, ink can more easily be dissolved by the solvent, and the image can more easily be removed from the recording medium.

Further, in the ink composition B according to one aspect of the present disclosure, the solvent used for dissolving the ink composition B is water, a weakly alkaline aqueous solution, or an organic solvent.

According to the above configuration, the image can be removed by simply wiping the ink on the recording medium by the soaked member in which any one of water, a weakly alkaline aqueous solution, and an organic solvent has been soaked.

Further, an ink jet recording device 21 according to an aspect of the present disclosure includes a recording head 31 that forms a coating layer on a recording medium (medium M) by first ink that is cured by receiving light irradiation and dissolved by a solvent while in a cured state, and forms an image layer on the coating layer by second ink; and an irradiation unit (left irradiation section 32A and right irradiation section 32B) that irradiates the first ink on the recording medium with light.

According to this configuration, a coating layer is formed by the first ink that is dissolved by the solvent while in the cured state, an image layer is recorded on a recording medium by forming the image formed of the second ink on the coating layer, so that the image layer is removed altogether by wholly removing the coating layer on the recording medium by the solvent, as a result of which the image can be removed. Since the coating layer can be formed by a normal recording step, a new step in addition to the normal recording step is not necessary, and work process therefor is simple. Further, since the first ink discharged from the recording head 31 is cured by the light from the irradiation unit at the same time as being discharged onto the recording medium, a step of drying the first ink is also not necessary. Further, since the coating layer formed of the first ink that is dissolved by the solvent while being in the cured state is printed and formed into an applied film by the recording head 31, selective formation of the coating layer only at a portion where effective pixels are in the image to be recorded, or any voluntary portion of the image, of which removal may be desired after having recorded the same, is possible. Due to this, by using the first ink only at the necessary portions, reduction of utility cost of the first ink and easiness of the removal of the coating layer can be improved.

Further, when the image is to be removed from the recording medium, the image can be removed simply by wiping the coating layer and the image layer on the recording medium by a soaked member in which the solvent has been soaked, so that the step of immersing the recording medium in the solvent is not necessary. That is, the work of removing the image from the recording medium is also easy for a user. Accordingly, the ink jet recording device 21 according to one aspect of the present disclosure can facilitate the recordation of the removable image easily from the recording medium with satisfactory workability.

Further, in an ink jet recording device 21 according to one aspect of the present disclosure, the recording head 31 forms the image layer by halftone printing.

According to the above configuration, with gaps formed at a voluntary interval in the image layer, the solvent enters the gaps and easily reaches the coating layer. As a result, the coating layer can effectively be removed by the solvent.

Further, in an ink jet recording device 21 according to one aspect of the present disclosure, a size of a printable range of the coating layer is equal to or larger than a size of a printable range of the image layer.

According to the above configuration, the coating layer can more effectively be removed by the solvent.

Further, an ink jet recording method according to one aspect of the present disclosure includes forming a coating layer on a recording medium by first ink that is cured by receiving light irradiation and dissolved by a solvent while in a cured state, and at the same time forming an image layer on the coating layer by second ink; and irradiating the first ink on the recording medium with light.

According to the above method, an advantage similar to that of the ink jet recording device 21 according to one aspect of the present disclosure can be achieved.

Further, in a method for reusing the recording medium according to one aspect of the present disclosure, a coating layer is formed on the recording medium by first ink that is cured by receiving light irradiation and dissolved by a solvent while in a cured state using an ink jet scheme, an image layer is formed on the coating layer by second ink using the ink jet scheme, and the image layer is removed from the recording medium by dissolving the coating layer by the solvent after having fixed the formed image layer by the light irradiation.

According to the above method, since the image can be removed simply by wiping the first ink (coating layer) on the recording medium by a soaked member in which the solvent has been soaked, the step of immersing the recording medium in the solvent is not necessary. That is, the work of removing the image from the recording medium is also easy for a user. Accordingly, the method for reusing the recording medium according to one aspect of the present disclosure can facilitate the removal of the removable image easily from the recording medium with satisfactory workability.

The present disclosure is not limited to the respective embodiments described above, and various modifications are possible within the scope indicated in the claims; and the embodiments obtained by suitably combining the technical features respectively disclosed in different embodiments are also included within the technical scope of the present disclosure.

INDUSTRIAL APPLICABILITY

The present disclosure can be utilized in an ink jet recording device that prints images that can be removed from a medium.

What is claimed is:

1. A method for reusing a recording medium, in which the recording medium is reused while an image formed on the recording medium is removed, wherein:

a coating layer is formed using an inkjet scheme on the recording medium by using a first ink containing a photocurable compound that is cured by receiving light irradiation, an image layer is formed on the coating layer by a second ink which is not dissolved by a solvent using an inkjet scheme, the image layer is removed from the recording medium by dissolving the coating layer by the solvent after having cured the coating layer, the first ink further contains a chain transfer agent which suppresses a molecular weight of a polymer of the photocurable compound, and the image layer is formed by halftone printing the second ink.

2. The method for reusing a recording medium according to claim 1, wherein the coating layer is formed by solid printing, and has a thickness of 1 μm or more.

3. An ink jet recording device, which uses an ink that is dissolved by a solvent after curing, and contains a chain transfer agent which suppresses a molecular weight of a polymer of the photocurable compound as a first ink, comprising:

a recording head that forms a coating layer on a recording medium by the first ink that is cured by receiving light irradiation, and after curing the first ink, forms an image layer on the coating layer by a second ink that is not dissolved by a solvent; and an irradiation unit that irradiates the first ink on the recording medium with light, wherein the recording head forms the image layer by halftone printing.

4. The ink jet recording device according to claim 3, wherein the recording head forms the image layer by halftone printing.

5. The ink jet recording device according to claim 3, wherein a size of a printable range of the coating layer is larger than a size of a printable range of the image layer.

6. The ink jet recording device according to claim 4, wherein the coating layer is formed to have a thickness of 1 μm or more by solid printing.

* * * * *